United States Patent [19]

Fischer

[11] 3,992,956

[45] Nov. 23, 1976

[54] MULTI-GEAR TRANSMISSION FOR TOYS

[76] Inventor: Artur Fischer, Altheimer Str. 219, D-7241 Tumlingen, Germany

[22] Filed: Nov. 8, 1974

[21] Appl. No.: 522,215

[30] Foreign Application Priority Data

Nov. 10, 1973 Germany............................ 2356209

[52] U.S. Cl..................................... 74/29; 46/248; 74/606 R
[51] Int. Cl.²......................................... F16H 19/04
[58] Field of Search........................... 74/29; 46/243

[56] References Cited
UNITED STATES PATENTS

| 1,421,571 | 7/1922 | Rodger | 74/29 |
| 3,499,336 | 3/1970 | Bianchi | 74/29 |
| 3,538,640 | 11/1970 | Hayes et al. | 46/243 LV |
| 3,608,233 | 9/1971 | Aoki | 46/243 M |

Primary Examiner—Samuel Scott
Assistant Examiner—Wesley S. Ratliff, Jr.
Attorney, Agent, or Firm—Michael J. Striker

[57] ABSTRACT

A longitudinal-reciprocation transmission component for multi-component toy assembly kits includes a transmission housing provided with a guide slot, a rack member received in and guided in said guide slot for longitudinal movement, a multi-gear transmission arranged inside the transmission housing and including a drive pinion projecting into the guide slot and meshing in the guide slot with teeth on the rack member, and connecting portions on the transmission housing for connecting the transmission housing to other components of a toy assembly kit.

10 Claims, 1 Drawing Figure

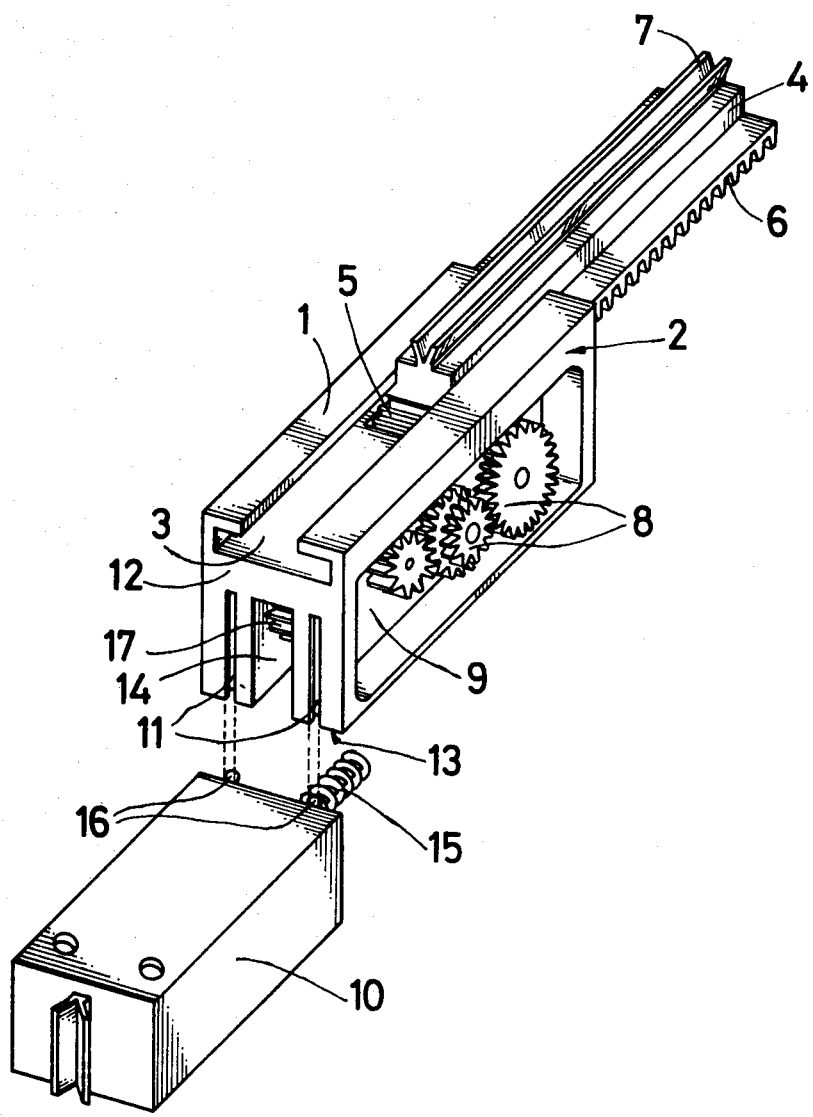

3,992,956

MULTI-GEAR TRANSMISSION FOR TOYS

BACKGROUND OF THE INVENTION

The invention relates to a gear-type transmission arranged in a transmission housing for use in toys, with connecting means for building the transmission into or onto a toy, such as a model of a machine.

Gear-type transmissions for the transmission of torque designed especially for use in toy assembly kits are known in many forms. The transmission housing can be provided with connecting means for connecting the transmission housings to other components of the assembly kit, for example to electromotors. For transmitting torque, these transmissions are provided with drive shafts projecting out of the transmission housings, and serving, for example, for driving the wheels of a toy vehicle.

It is a general aim in the design of toy assembly kits to make as simple as possible the construction of toy models which resemble closely the large-scale real-life machines and constructions which are to be simulated with the toy assembly kits. Besides rotary motions, large-scale real-life machines frequently make use of longitudinal reciprocatory lifting and lowering or pushing and pulling movements; such movements in real life are most often realized by means of hydraulic and/or pneumatic cylinder arrangements. The miniaturization of pneumatic and hydraulic systems for use in toy assembly kits is very difficult and would be a very costly matter.

SUMMARY OF THE INVENTION

It is accordingly a general object of the invention to provide, as a component of a toy assembly kit, a component capable of producing longitudinal reciprocatory lifting-lowering or pushing-pulling movements.

This object, and others which will become more understandable from the description, below, of a preferred embodiment, can be met according to one advantageous concept of the invention by providing the housing for the gear-type transmission with a guide for a rack member; to produce the desired longitudinal reciprocation, the rack member meshes with a pinion of the gear-type transmission.

If now the inventive transmission is driven, for example, by a reversible electric motor, the pinion meshing with the rack will move the rack along the direction of elongation of the guide in the transmission housing. In this way, the rotary motion of the pinion will be converted into a longitudinal reciprocation of the rack member. By reversing the rotary direction of the reversible electric motor, there is achieved the desired back-and-forth motion which, when the inventive transmission component is used in a toy assembly kit, markedly increases the construction possibilities for the toy assembly kit.

The rack member is guided in the transmission housing, so that the longitudinal-reciprocation transmission takes up scarcely more space than an ordinary rotary-motion gear-type transmission for a toy assembly kit. Additionally, the transmission has as a result a very compact and easily manipulated form, which is easily handled even by younger children. To make the longitudinal-reciprocation transmission ready for use, it is only necessary to slide the rack member into the guide slot to such an extent that the teeth on the bottom side of the rack member come into engagement with the teeth of the pinion which projects into the rack member guide slot.

According to a further advantageous concept of the invention, the guide slot in the transmission housing can be a groove of T-shaped cross-sectional configuration, and the rack member can have a substantially complementary cross-sectional configuration. The T-slot will be located on the upper side of the transmission housing and will extend in the direction of the transmission, so that the guidance of the rack member will be over a long distance and easily established.

According to a further concept of the invention, the connecting means on the transmission housing can be undercut grooves, preferably arranged on both end faces of the transmission housing. These connecting means permit the building onto the inventive transmission component of additional components of the toy assembly kit such as are provided with connecting means complementary to those provided on the transmission housing.

According to another concept of the invention, if the transmission housing is to be coupled to a toy motor having an output shaft provided with an output worm screw on the front face of the motor, then the transmission housing on the side thereof which faces towards the motor is provided with a recess into which the worm gear extends when the transmission housing and toy motor are joined, with the transmission in the transmission housing including a worm gear which meshes with and is driven by such worm screw, when the transmission housing and toy motor are coupled together. In this way, there can be achieved a direct and uncomplicated transmission of the motor torque exerted at the output worm screw through the transmission to the rack member. The height of the transmission is so selected that the motor to be coupled to the transmission does not block the path of reciprocatory movement of the rack member. The lateral grooves in the transmission housing can serve to protect the motor output shaft and the worm gear of the transmission, and additionally, in order to ensure proper meshing of both transmission parts with each other, be limited in their length for the formation of stops.

To protect the transmission, i.e., the gears, and to increase the ease with which the transmission can be handled and manipulated, it is contemplated, according to another concept of the invention, to arrange the gears of the transmission withdrawn back from the plane of the side walls of the transmission housing, so that no moving gears project beyond the side walls of the transmission housing.

Finally, according to a still further concept of the invention, the upper side of the rack member, i.e., the side opposite that provided with the rack teeth, is provided with connecting means, preferably an undercut connecting ridge running along the length of the rack member. The connecting ridge serves for the connecting on of other componenets of the toy assembly kit. Also, it is possible to form a rack of increased length, by employing two rack members such as described above, aligned with each other and connected together by means of a third member connecting them together by engaging the connecting ridges of both rack members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE depicts one exemplary embodiment of the invention.

DESCRIPTION OF THE PREFERRED EMBODIMENTS

The FIGURE depicts a longitudinal-reciprocation transmission and an electromotor to be coupled thereto. The upper side 1 of the transmission housing 2 is provided with a T-shaped guide slot 3 for the rack member 4. The longitudinal reciprocation of the rack 4 in the guide slot 3 results from the rotary motion of a pinion 5 which projects into the guide slot 3 and which is provided with teeth which mesh with the rack teeth 6 provided on the bottom side of the rack member 4. The cross-sectional configuration of the rack member 4 is substantially complementary to that of the guide slot 3. For the purpose of attaching components of a toy assembly kit, the upper side of the rack member 4 is provided with an undercut connecting ridge 7 running along the length of the rack member 4. This connecting ridge 7 almost makes it possible to form a longer rack, using two rack members 4 such as that illustrated, aligned with each other and connected to form a single rack by means of a third component connecting together the ridges 7 of the two rack members 4.

The gears 8 forming part of the transmission are arranged in recesses 9 in the side walls of the transmission housing 2, so that none of these moving parts project beyond the general planes of the transmission housing side walls. This facilitates handling of the transmission housing.

For the purpose of attaching on various components of a toy assembly kit, particularly an electric motor component 10, the end faces 12 of the transmission housing 2 are provided with connecting means 11, preferably in the form of undercut grooves. The end face 12 of the transmission 2 which is visible in the FIGURE is provided with a recess 14 which extends up from the bottom side 13 of the transmission housing 2. The worm screw 15 on the output shaft of electromotor 10 is received in this recess 14. The lengths of the grooves 11 and the lengths of the connecting ridges 16 on the front face of the housing of motor 10 (turned away from the viewer in the FIGURE) are so selected relative to each other that, when the motor is coupled onto the transmission housing 2, there is every time achieved reliable meshing between the worm screw 15 and the cooperating worm gear 17.

Depending upon the intended use, the transmission housing 2 is fixedly mounted in the toy model while the rack 4 performs the longitudinal reciprocatory motion, or else the relationship is inverted and the rack member 4 is fixedly mounted in the toy model and the gear-type transmission with the motor unit coupled thereto moves as a whole along the length of the rack member 4. The back-and-forth movement is produced by periodically reversing the polarity of the electromotor 10, in per se known manner. If the rack member 4 is removed from the guide slot 3, then a gear or pinion can be brought into engagement with the pinion 5 which projects into the guide slot 3.

The lengthening of the rack 4 can additionally be effected by means of the undercut connecting ridge arranged on the upper side of the rack member using connecting means provided on the end face of the rack member. The connecting means preferably would be comprised of connecting bores extending in the direction of elongation of the rack members to be connected together, with connecting pins or rods or other connecting members being inserted into the connecting bores. It will be understood that each of the elements described above, or two or more together, may also find a useful application in other types of constructions differing from the types described above.

While the invention has been illustrated and described as embodied in a multi-gear longitudinal-reciprocation transmission whose input gear is a worm gear, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. A longitudinal-reciprocation transmission component for multi-component toy assembly kits, comprising a transmission housing provided with a guide slot; a rack member received in and guided in said guide slot for longitudinal movement; a multi-gear transmission arranged inside said transmission housing and including a drive pinion projecting into said guide slot and meshing in said guide slot with teeth of said rack member; and connecting means comprising undercut grooves provided on said transmission housing for directly and releasably connecting said transmission housing with other components of a toy assembly kit.

2. A transmission component defined in claim 1, wherein said guide slot and said rack member are of generally complementary T-shaped cross-sectional configuration.

3. A transmission component defined in claim 1, wherein said transmission housing is generally rectilinear and has two side faces provided with recesses, and wherein at least some of the gears of said multi-gear transmission are located in said recesses without projecting beyond the generally rectilinear periphery of said transmission housing.

4. The transmission component defined in claim 3, wherein said multi-gear transmission further includes a worm gear constituting the input gear of said multi-gear transmission, and wherein said transmission housing is provided at one end with a recess giving access to said worm gear, and wherein said connecting means comprise connecting portions located at the end of said housing at which said worm gear is located, for connection to such end of said housing of means for driving said worm gear.

5. A transmission component defined in claim 1, wherein said transmission housing is generally rectilinear and has two side faces provided with recesses, and wherein said rack member is elongated; and wherein said multi-gear transmission comprises a plurality of annular gears each of which is located in said recesses.

6. A longitudinal-reciprocation transmission component for multicomponent toy assembly kits, comprising a generally rectangular transmission housing provided with a guide slot and having two end faces; a rack member received in and guided in said guide slot for longitudinal movement; a multi-gear transmission arranged inside said transmission housing and including a drive pinion projecting into said guide slot and meshing in said guide slot with teeth of said rack member; and connecting means comprising undercut grooves provided on said end faces of said transmission housing for directly and releasably connecting said transmission housing with other components of a toy assembly kit.

7. A longitudinal-reciprocation transmission component for multi-component toy assembly kits, comprising a transmission housing provided with a guide slot; a rack member received in and guided in said guide slot for longitudinal movement, said rack member being provided on one side thereof with teeth and on the other side thereof with an undercut connecting ridge running along the length of said rack member; a multi-gear transmission arranged inside said transmission housing and including a drive pinion projecting into said guide slot and meshing in said guide slot with said teeth of said rack member; and connecting means on said transmission housing for directly and releasably connecting said tranmission housing with other components of a toy assembly kit.

8. A longitudinal-reciprocation transmission component for multi-component toy assembly kits, comprising a transmission housing provided with a guide slot and at one end with a recess; a rack member received in and guided in said guide slot for longitudinal movement; a multi-gear transmission arranged inside said transmission housing, including a drive pinion projecting into said guide slot and meshing in said guide slot with teeth of said rack member and a worm gear constituting the input gear of said multi-gear transmission; connecting means comprising connecting portions at the end of said transmission housing at which is provided said recess which gives access to said worm gear on said transmission housing for directly and releasably connecting said transmission housing with other components of a toy assembly kit; and an electromotor component comprised of an electro-motor housing and a motor output shaft provided with a worm screw projecting from said electromotor housing, said electromotor housing being provided with cooperating connecting portions for detachably connecting together said electromotor housing and said transmission housing in a manner bringing said worm screw and said worm gear into engagement.

9. A longitudinal-reciprocation transmission component for multicomponent toy assembly kits, comprising a transmission housing provided with a guide slot; a rack member received in and guided in said guide slot for longitudinal movement, said rack member being provided on one side thereof with teeth and on the other side thereof with means for connecting said rack member to other components of a toy assembly kit; a multi-gear transmission arranged inside said transmission housing and including a drive pinion projecting into said guide slot and meshing in said guide slot with said teeth of said rack member; and connecting means on said transmission housing for directly and releasably connecting said transmission housing with other components of a toy assembly kit.

10. A longitudinal-reciprocation transmission component for multi-component toy assembly kits, comprising, in combination, a transmission housing provided with a guide slot of generally T-shaped cross-sectional configuration; a rack member of generally complementary T-shaped cross-sectional configuration received in and guided in said guide slot for longitudinal movement; a multi-gear transmission arranged inside said transmission housing and including a drive pinion projecting into said guide slot and meshing in said guide slot and meshing in said guide slot with teeth of said rack member; and connecting means on said transmission housing for connecting said transmission housing with other components of a toy assembly kit.

* * * * *